Dec. 1, 1936.  A. WEILAND  2,062,435
METHOD AND MEANS OF DETECTING REFRIGERANT LEAKS
Filed Dec. 23, 1933

INVENTOR
A. Weiland
BY
ATTORNEY

Patented Dec. 1, 1936

2,062,435

UNITED STATES PATENT OFFICE 2,062,435

METHOD AND MEANS OF DETECTING REFRIGERANT LEAKS

Alfred Weiland, Philadelphia, Pa., assignor to Baldwin-Southwark Corporation, a corporation of Delaware Application December 23, 1933, Serial No. 703,803

1 Claim. (Cl. 137—77)

This invention relates generally to improved means for detecting refrigerant leaks in pipe joints.

Refrigerant leaks have been a major problem in the manufacture of small refrigerating systems, such as domestic refrigerators or air conditioning apparatus of small capacity, as the quantity of refrigerant in such systems is so small that any leakage quickly lowers the capacity of the system. Various methods have heretofore been employed in an attempt to detect leaks which occur principally around the pipe joints or connections. One method is to bring into contact with the leaking refrigerant any suitable chemical that will react therewith to form a cloud. In the case of refrigerant ammonia, a sulphur stick may be used or in the case of refrigerant sulphur dioxide, an ammonia swab will suffice as in each case a cloud is formed. Still another method is to observe any visible signs of an oil leak around the joint as oil is usually carried in the flow of refrigerant and will leak therewith through the joints, while in other cases an alcohol flame is played around the joint, these methods being used particularly with the well-known refrigerant Freon.

However, these and other methods are not adequate or sufficiently effective in detecting leaks of certain types of refrigerants such for example as $CF_2CL_2$ (Freon), especially when the leak is very small. It has been proposed that a small amount of ammonia be mixed with such gas so that a sulphur stick might be used to detect leaks, but this has been unsatisfactory because of the relatively large amount of ammonia that would have to be used to obtain complete results. Another difficulty with the prior methods is that they are primarily applicable only for temporary inspection purposes, there being no permanent means associated with the joint to tell that a leak has occurred after the joint has been initially inspected or after the unit has been placed in service.

It is one object of my invention to provide improved means for detecting leaks, especially of $CF_2CL_2$, by employing any suitable rubber composition painted or otherwise spread on the surface of the joint, whereby it is found that a very small leak, that could not be detected by other methods, will form a gas bubble and thus provide visible evidence of a leak. Moreover it is found that even though a leak should occur after the rubber becomes set, the rubber coating will soften and become sticky.

Other objects and advantages will be more apparent to those skilled in the art from the following description of the accompanying drawing in which.

Figure 1:
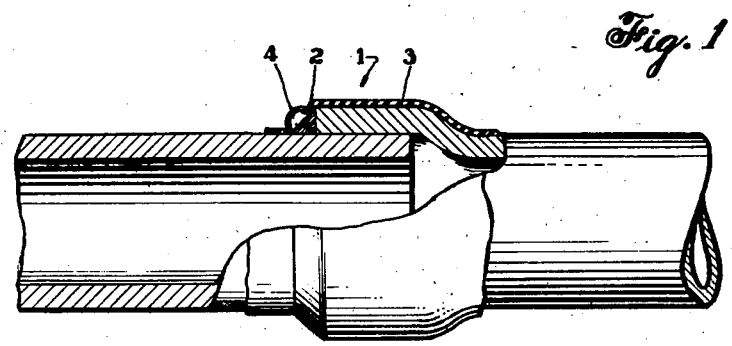
Fig. 1 is a pipe joint with parts broken away to show details of a joint covered with rubber.

My improved method may be applied to all forms of metallic gas-filled members including joints and connections, but for purposes of illustration there is shown in Fig. 1 a pipe joint 1 closed in any suitable manner, such as by welding, brazing, soldering or the like. In such joints or other gas-filled members the possibilities of leaks may occur as diagrammatically indicated at 2. It is, of course, to be understood that the present invention is particularly applicable to $CF_2CL_2$ gas, although the detecting means may be used with other refrigerants as well. If the $CF_2CL_2$ leak is of sufficient size, it may be detected with an alcohol flame, but this is not satisfactory with very small leaks. Hence to detect these small leaks I have found that if a thin layer 3 of any suitable fluid rubber composition or cement is painted or otherwise spread over the surface of the joint the leak in gas will gradually or rapidly, depending upon the size of the leak, form a bubble 4, thereby providing visible evidence of a leak and its location. If the $CF_2CL_2$ gas is allowed to continue to leak, the rubber surrounding the leak becomes softer than the remaining portion of the rubber. In case no leak is present at the time of placing the rubber on the joint or if the leak is so small that it will not raise a bubble before the rubber becomes set or partially set, still the subsequent occurrence of a leak will cause the set rubber to become sticky, possibly followed by the formation of a bubble.

Figure 2:
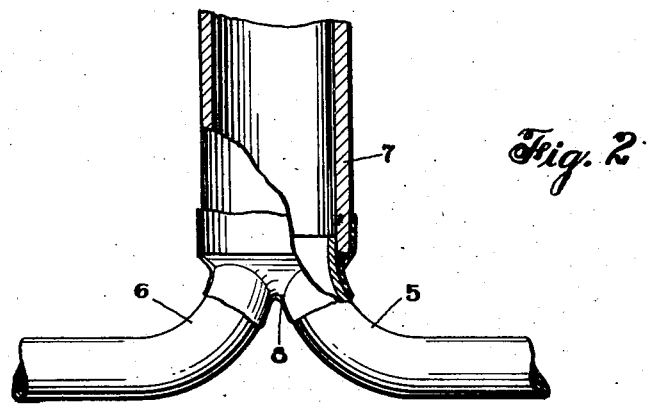
Fig. 2 is another form of joint in which leaks are particularly difficult to detect.

As a result of the foregoing method and means, it is seen that very minute leaks may be effectively detected, not only when the joint is initially made but also after the joint has been in service for an appreciable period of time. In the case of a T joint, such as shown in Fig. 2, wherein pipes 5 and 6 are connected to a main pipe 7 to form a wedge opening 8 that is ordinarily awkward or difficult to inspect even with a flame, it is seen that my improved method and means can be effectively employed.

Any rubber composition may be employed having a gum-rubber or latex base rendered fluid by any usual solvent, and coloring matter may be mixed therewith to facilitate detection of the bubbles, or a relatively clear rubber solution may be employed if desired. One specific rubber composition that has been found useful includes rubber, zinc oxide, red oxide, sulfur, lime and burgundy pitch in the proportions respectively of 30, 39, 12, 6, 4 and 9 by weight. Other compositions having flexible characteristics might be used equally as well as rubber in as much as the broad principle involved herein is to provide an imperforate flexible covering around the joint or gas-filled member in intimate physical contact therewith so that escaping gas will bulge the layer of material at the precise points of leakage. The intimate contact of the rubber is not created by vulcanizing but is effected only by painting the composition on the joint or member.

It will of course be understood that various changes in details of the component elements may be made by those skilled in the art without departing from the spirit of the invention as set forth in the appended claim.

I claim:

The combination in a refrigerating system comprising a member filled with $CF_2 CL_2$ gas and a liquid rubber composition permanently spread or coated over the surface of said member and allowed to become set, whereby in the event of a leak of said gas through said member said rubber will give a visible indication of the leak.

ALFRED WEILAND.